March 7, 1939.  R. C. SCHOCK  2,150,009
LAUTER MACHINE
Filed Dec. 13, 1937  2 Sheets-Sheet 1
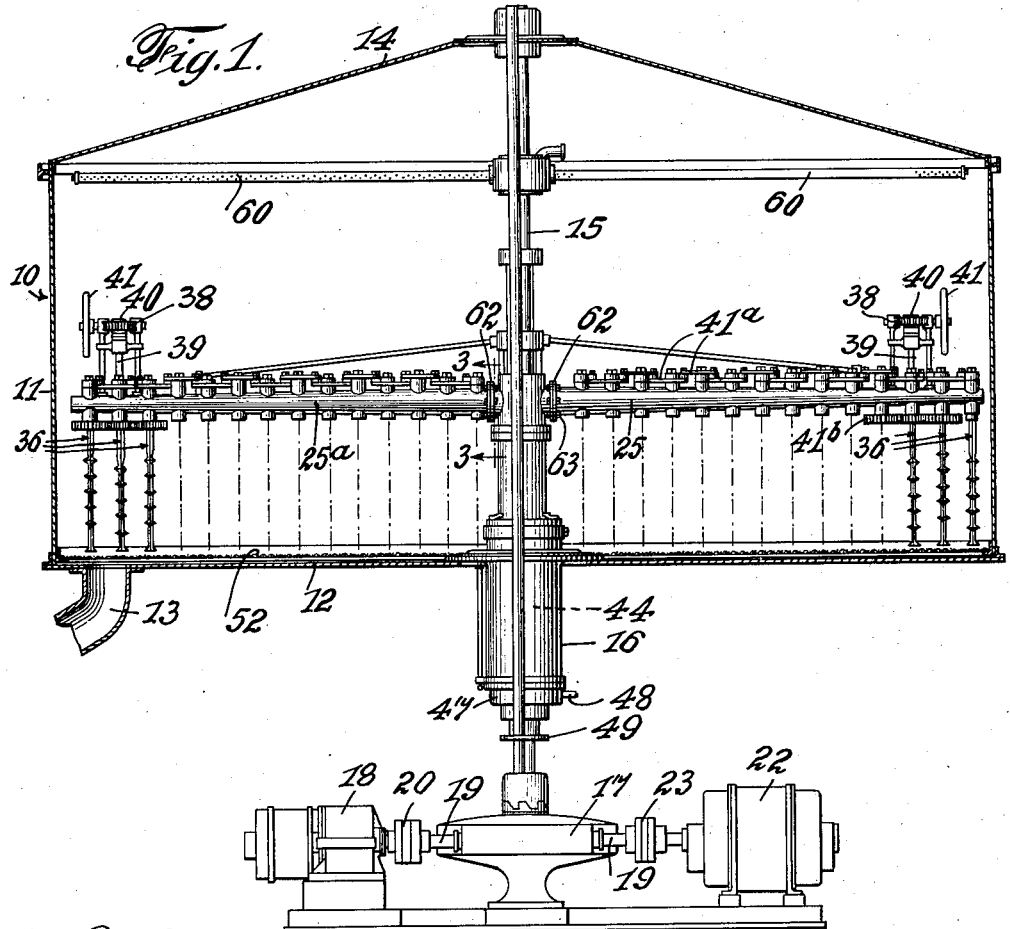
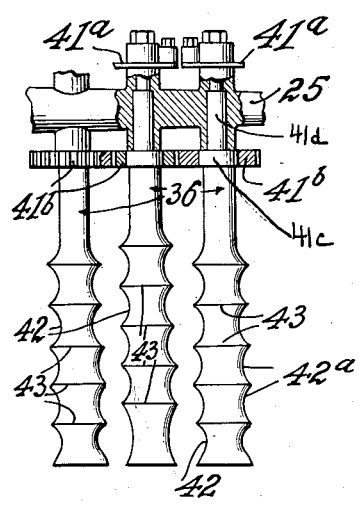
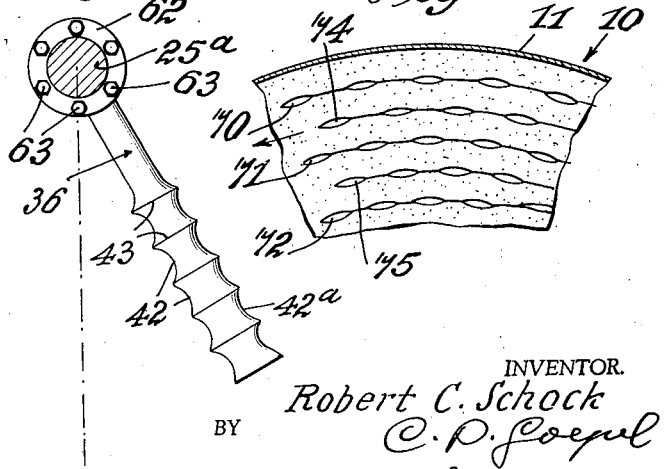
INVENTOR.
Robert C. Schock
BY C. P. Goepel
his ATTORNEY.

March 7, 1939.  R. C. SCHOCK  2,150,009
LAUTER MACHINE
Filed Dec. 13, 1937  2 Sheets-Sheet 2
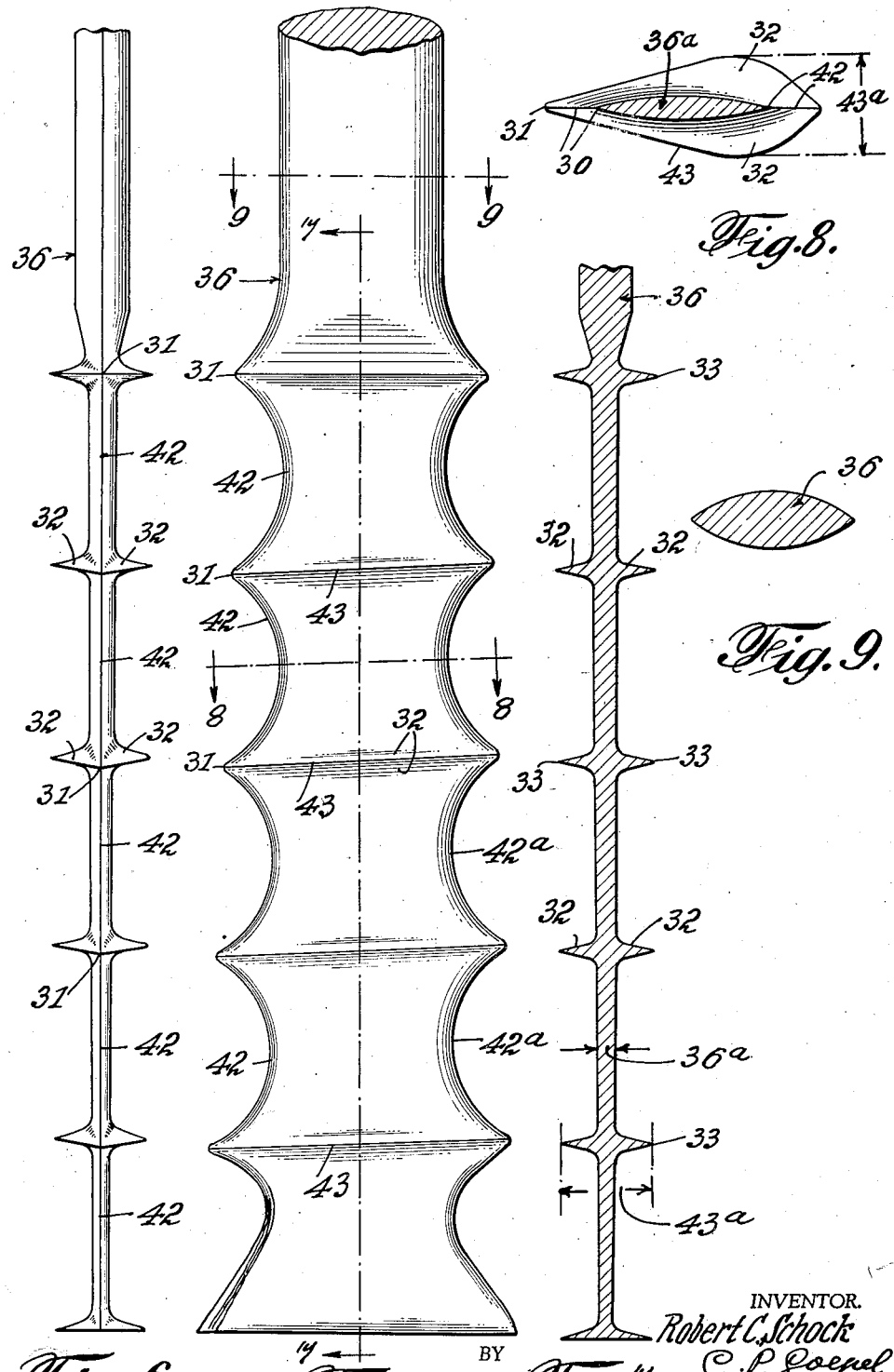
INVENTOR.
Robert C. Schock
C. P. Goepel
his ATTORNEY.

Patented Mar. 7, 1939

2,150,009

UNITED STATES PATENT OFFICE 2,150,009

LAUTER MACHINE

Robert C. Schock, New Rochelle, N. Y., assignor to Schock, Gusmer & Co., Inc., Hoboken, N. J., a corporation of New Jersey Application December 13, 1937, Serial No. 179,535

11 Claims. (Cl. 259—107)

This invention relates to lauter machines.

The subject matter of this application embodies improvements over the subject matter shown in U. S. Letters Patent to myself dated December 14, 1937, No. 2,102,385.

The object of this invention is to provide a novel lauter machine, in which substantially all parts of a mass of grains are subjected to a gentle momentary separation on the least disturbance of the same, to enable the wort to be run off, the grains in the mass being also displaced from the bottom to the top in the container.

Furthermore, the invention has for its object to provide means whereby, after the wort has been finally drawn off the spent grains, the same means may be used to discharge the spent grains from the container.

Another object of the invention is to provide the means for adjusting the lauter mechanism to a mixing device, prior to using it to lauter.

The object of the invention is to provide a knife for the lauter machine which has a sharp impinging edge, followed by a streamline body terminating in a sharpened yet rounded rear edge, with a plurality of spaced horizontal lentil-like separators upwardly inclined from the front to rear, with a configuration resembling that of the body portion of the knife, the front of the separator being sharp and in a streamline contour widening out to a rear end, the separators extending outwardly from the body of the knives to act as inclined planes to force the grains thereover, the body of the knife and separators agitating the mass of the grain as little as possible, both knife and separators acting to loosen the grain while raising it, so as to enable the wort to separate from the grain, and thereby obtain the maximum extraction of the wort. A plurality of such knives with the separators arranged adjacent to each other with the separators of the adjacent knives arranged staggered and with one set of knives with separators traversing paths untraversed by another set of knives with separators, brings about a loosening of the entire mass of grain.

Finally, the knives with their angular separators can be used to perform other work than lautering, first by transposing the lateral sides of the knives to the direction of movement of the knives and thus be presented partially to the mass. Thereby, the mass of spent grain can be moved from the interior portion to the outer portion of the container, so as to readily empty the container after all the possible amount of wort has been extracted. Also, by placing the knives at an angle to the vertical, the knives and inclined separators can be used to first mix the grains, before subjecting them to a lautering action.

The invention has also for its object to provide a method of lautering which consists essentially in subjecting a mass of grains throughout the mass to momentary separation so as to loosen them throughout the mass, at the same time, raising the lower part of the mass to the upper part thereof, at the parts of the mass acted upon by the separators.

The invention consists of a new lauter knife having a flat streamline body with a sharp front edge, and spaced separators or planes thereover, each inclined from front to rear, pointedly sharp at the front and widening in streamline fashion to the rear, the separators extending from the body of the knives table-fashion, and lentil shaped in vertical section, having lateral sharp edges.

The invention consists further of a lauter machine having a container, a central post thereon adapted to be rotated, a longitudinal horizontal arm extending from the post, and a plurality of the aforesaid knives superposed substantially vertically downward therefrom.

The invention consists further in staggering the separators to each other in said machine.

The invention consists further in providing one or more arms extending from the chamber post in opposite direction, and having a plurality of such knives extending therefrom.

The invention consists further in not alone staggering the knives of the second arm, but offsetting the knives on the other arm so that the knives of this second arm from the central post traverse the mass of grains in such a manner as to have the knives pass through that part of the mass not traversed by the first set of knives on the first arm.

The invention consists further in means for moving the knife sides against the direction of movement of the knives and against the mass, so as to move the mass radially outwards of the container.

The invention consists further in providing means for placing the knives at an angle to the vertical, the lowermost ends of the knives being at the rear of the upper ends, so as to mix the mass under increased speed provisions.

Finally, the invention consists of a method which consists in subjecting a mass of grains to the action of separation under least disturbance in the mass, such separating action taking place throughout the entire mass, circumferentially, both vertically and horizontally, whereby such loosening enables the wort to be extracted.

In other words, the cutting of the furrows in the filterbed by the streamline devices, as an example, is done in such a manner so as not to disturb the filterbed, so that cloudy liquid will not flow from the tank, to buoy up the filterbed, so as to allow as complete extraction as is possible of the soluble masses of the filterbed, and to do this filtration in as short a time as is possible.

The invention consists of the foregoing and also of other features, which will be more fully described hereinafter in connection with embodiments of the invention, which embodiments will also be shown in the drawings, and the invention will be finally pointed out in the claims.

In the accompanying drawings:

Figure 1 is a vertical central section of a mash filtering machine constructed according to an embodiment of this invention, all of the knives being arranged in lautering position;

Figure 2 is an enlarged fragmentary vertical section of the right hand portion of Figure 1, showing the knives disposed in a position at an angle to the position shown in Figure 1;

Figure 3 is a section taken on line 3—3 of Figure 1, showing the angular displacement of the knife in respect to the vertical;

Figure 4 is a diagrammatic partial view of the contents of the tank showing a momentary widening out of the grains due to the passage therethrough of the knives, and at the same time showing the different paths of the knives on different radial supports;

Figure 5 is a side view of the improved knife broken off at its shank;

Figure 6 is a front end view of Figure 5 at its cutting edge;

Figure 7 is a central section taken on line 7—7 of Figure 5;

Figure 8 is a transverse section taken on line 8—8 of Figure 5; and

Figure 9 is a transverse section taken on line 9—9 of Figure 5.

Similar characters of reference indicate corresponding parts throughout the various views.

Referring to the drawings, the numeral 10 designates generally a tub or tank having a cylindrical side wall 11 and a relatively flat bottom wall 12. Outlets 13 are secured to the bottom wall 12 so that the spent grains may be removed from the tub 10 when desired. A top or cover 14 engages the upper portion of the tub. The tub 10 is stationary and may be supported on a suitable base or other supporting means (not shown). The wort syrup or juice filters through the false bottom 52, and in the bottom there are a series of eight to twenty-one inch diameter or larger openings connecting to a central collecting tank through which the wort flows. The cover 14 is provided with two hinged manholes at 90° to each other (not shown) to allow adjustment of lautering knives. The tub is filled through a circular opening (not shown) in the top 14 approximately eight inches in diameter.

A shaft 15 extends vertically and axially of the tub 10 and constitutes the driving shaft for the mixing and cutting devices hereinafter described. The drive shaft 15 extends downwardly through a bearing or bushing and has a worm gear (not shown) secured to the lower end thereof. A motor or power member 18 is coupled to a worm shaft 19 by means of an overrunning clutch 20 of conventional construction, and the worm secured to the shaft 19 meshes with the worm gear in the casing 17 so as to effect rotation of the drive shaft 15.

A second power member 22 is also coupled by means of an overrunning clutch 23 to the shaft 19, and this second power member 22 is preferably of higher power than the first power member 18 for mixing purposes and for removal of grains. The second power member 22 is operated, with the first power member 18 cut off. Motor 22 is the larger size motor and is used for mixing apparatus, and also for the removal of the grains which is accomplished by adjusting the lauter knives 36 to the position about 45° from that shown in Fig. 1. Motor 22 is an adjustable speed motor having a shaft driving speed range of usually from 6 to 12 R. P. M., while motor 18 is either variable or constant speed motor and is designed to operate the cross arms at one revolution in three minutes.

The arm 25 has a plurality of vertically disposed cutting members 36 mounted therein which are connected together by a linkage 41a, and these cutting members 36 are adjusted by means of a worm gear 38 secured to a shaft 39. A worm 40 meshes with the gear 38 and is rotated by a hand wheel 41. Links 41a are moved by the shaft 39 in order to rotate the knives on their axes. Gears 41b intermesh.

Each blade 36 has a vertically disposed scalloped or fluted cutting portion 42 and a plurality of plows or separators 43 which are disposed on an inclination to the horizontal, as shown in Fig. 5, so that as these blade members 36 are swung around in the tub 10 the mash will be lifted by the plows or separators 43. The blade members 36 have a sharpened front edge 30, as seen in Fig. 8, and a similar rear edge, the horizontal cross section being lentil-shaped in streamline fashion so that while these blades cut through the mass of the grains, they disturb the grains as little as possible. The plows or separators 43 have a very sharp point 31 at their forward ends, and form inclined table portions 32 around the blades. These table portions 32 extend very slightly beyond the vertically arranged blades, and the table portions 32 merge into sharp edges 33. The blades 36 having the curved portions 42 and 42a at the front and rear, thus enable the plows or separators 43, due to their protruding positions in respect to the blades 36, to act as little ships of streamline contour to enter the grains and to separate them in a manner involving the least amount of disturbance to the mass. The relation of the thickness of the web portion 36a and the width of the table portion 43a is shown in Figure 8.

This is a very important point inasmuch as it tends to buoy up the mash during the revolving of the lautering knives, and keeps it from packing, thus allowing for more complete extraction and leeching. Plows 43 are also staggered in respect to each other in that the plows in the adjoining lauter blades are not on the same horizontal planes, as seen in Fig. 1. Also, when more than one radial rod is provided, the knives are vertically staggered, that is, the knives of one rod pass through a different path than the knives of the other rod. In Fig. 1, a second radial rod 25a is provided with knives 36 suspended therefrom, which, however, are so arranged as to pass through the untraversed paths of the knives of rod 25.

As seen in Figure 5, the table portions of the superposed plows 43 have different inclinations to the horizontal, the lowest plow having the greatest inclination, the next one less, and so on. The mass has the greatest pressure at the bottom of the tub, and this pressure is least at the top level of the mass. Hence, the various inclinations of the plows are adapted to the variations in the pressures of the mass. The front edges of the plows are on a line inclined upwardly and rearwardly from a horizontal line.

In order to provide a means whereby the arms 25 and 25a with the knives may be lifted out of the mash when desired, I have provided a plunger 44 which is vertically slidable, but not rotatable in the bushing or cylinder 16.

The lower end of the cylinder 16 is provided with a head or cap 47 having a pressure line 48 connected thereto, and a gland 49 seals the cap 47 about the shaft 15.

The tub 10 may also be provided with an inner or false bottom 52 which is preferably slotted or perforated, and which is supported in any suitable manner in upwardly spaced relation to the bottom 12.

In the use and operation of this filtering device, the desired mash and liquid is placed in the tub 10 and the motor 22 then operated to turn the shaft 15. Rotation of the shaft 15 will swing the arms 25 and 25a.

The arm 25 will swing about the post 15, and the cutting members 36 carried by the arm 25 will keep the mash at an even density throughout the depth thereof. Adjustment of the cutting and stirring members 36 may be made by means of the hand wheel 41 so that these members 36 may loosen up the mash to the desired degree.

The mash mixing and cutting means may be raised out of the mash while in motion by means of the plunger 44, it being only necessary to discharge the liquid under pressure in the lower portion of the cylinder 16 through the pipe 48.

After the cutting means have been working for a period of time and the mash becomes converted, the motor is stopped, pressure is applied through pipe 48 and arms 25 and 25a elevated out of the mash. After a sufficient resting period motor 18 is placed in operation at a relatively slow speed and by means of a valve on pipe 48 arms 25 and 25a are gradually lowered into the mash cutting furrows in the mash to allow proper leeching to take place and at the same time hasten the rate of filtration. When the motor 22 is set in operation, the motor 18 is cut off. The overrunning clutches 20 and 23 will readily permit the operation of either of these motors either singly or together. After the mash has been converted, it is then proper to draw off the wort, and the lautering arms are adjusted in such a position that a furrow is cut into the filtering bed as the lautering knives are gradually lowered into the mash. This allows the sparge water to penetrate into the furrows and extract or leech the wort from the grains.

A spray pipe 60 is arranged above knives and grain.

To adjust the knives 36 angularly, collars 62 secured by bolts 63, enable the knives to be adjusted in position. Other suitable means may be provided. When the knives are so angularly disposed, rearwardly and downwardly, they can be used for mixing. No thickening of the mash occurs during the mixing operation, merely a conversion of the starch into sugars. The slower speed is used for the lautering in order to obtain proper leeching and extracting.

In Fig. 4 is shown a diagram of the passage of the lentil-like table portions through the grains. The gaps 70, 71 and 72 correspond to the table portions of the knives on one rod; the gaps 74 and 75 corresponding to the other knives. Circles passing through the gaps 70, 71, 72, 74 and 75 indicate the circumferential paths of the knives. The gaps are formed, but gradually dissolve, so to say, in the connecting lines. It will be noted that the gaps 70, 71 and 72 are formed by one set of knives and the intervening gaps 74 and 75 by another set of knives on the other radial rod 25a, acting staggered, so to say.

Thus, one entire mass of grains, vertically and horizontally, is subjected to sharp knife edges with very narrow width of web. Thereby, a new method of lautering grains has been provided.

It will be noted from Fig. 3 that the table portions are considerably inclined to the vertical whereby such table portions act as mixing blades.

As seen in Fig. 1, the lower ends of the knives 36 are substantially in one plane.

The tub, after it has been supplied with the desired amount of grain, has the rod 25, and rod 25a in case two rods are used, suspended entirely above the top of the grain surface. After the grain has been allowed to react a while, the rods with their knives are allowed to descend under hydraulic action very slowly, so as to permit the knives with their bottom foremost to enter the grain bed. This entering is very slow so as to prevent a clouding of the liquid. When the knives have reached their lowermost position, then they are moved circumferentially. It is here important that the knives even above their uppermost plows or separators are of little thickness and are sharpened so as to easily enter the grain bed. Contrary to devices heretofore proposed which push the grain away and cause hollow spaces which set up turbulences and cause cloudiness, the sharpened edges and relatively very narrow widths of the knives quietly cut into the bed. Also of importance is that with devices which were provided with front edges substantially parallel with the axes of such devices, a pushing up of the bed from the bottom upwards would also cause turbulences and cloudy disturbances, whereas in this invention the front of the knives being inclined to the axis of the knife, upwardly and rearwardly, with the sharp peaks of the separators in that inclined line, the knife as an entirety acts as a plow, with the most forward point of the knife being lowermost and each part extending in a curve rearwardly and upwardly. Not alone does the knife as an entirety thus act as a plow, but the separators, each at a different inclination, also act as plows.

In Fig. 2 the knives are shown with their broadsides, and in a position substantially at right angles to the position shown in Figure 1. This drawing is for the purpose of clarification. To discharge the spent grain from the tub, the knives, however, are rotated or shifted only 45° from the position shown in Fig. 1.

The knife 36 up to the collar 41c, as shown in Fig. 2, is sharpened both at the front and rear; thus it is sharp from its bottom to its top, throughout its length, as seen in Fig. 2. These knives have a collar 41c and an extending cylindrical rod 41d, extending beyond the knife portion.

The use of mash treating means hereinbefore described eliminates the use of a number of tubs for each separate treatment of the mash and provides an exceedingly compact structure which is easy to operate and which may be readily cleaned.

It is obvious that various changes and modifications may be made in the details of construction and design of the above specifically described embodiment of this invention without departing from the spirit thereof, such changes and modifications being restricted only by the scope of the following claims:

What I claim is:

1. A mash treating machine comprising a tub, a central post in said tub, an arm extending from said post, radially outward to the wall of the tub, a plurality of knives on said arm and depending downwardly therefrom into the mash of the tub, said knives having a horizontal cross section forming a front knife edge, widening, and a rear edge, and having a vertical section forming a plurality of front concave curves, plows spaced apart on said knives at the juncture lines of said curves, and inclined to the longitudinal axes of said knives rearwardly upwardly, each plow having in plan a sharp front entrance point, and widening to form table portions laterally of the knife, and having a closed rear portion, and each plow having in vertical view a sharp front edge point, and tapering sides merging to a knife edge, the front edge of each plow being on a line inclined upwardly and rearwardly from the horizontal.

2. A mash treating machine comprising a tub, a central post in said tub, an arm extending from said post radially outward to the wall of the tub, a second arm extending in a different direction to the post, a plurality of knives on said arm and depending downwardly therefrom into the mash of the tub, said knives having a horizontal cross section forming a front knife edge, widening, and a sharp rear edge and having a vertical section forming a plurality of front concave curves, plows spaced apart on said knives at the juncture lines of said curves, and inclined to the longitudinal axes of said knives rearwardly upwardly, each plow having in plan a sharp front entrance point, and widening to form table portions laterally of the knife, and having a closed rear portion, and each plow having in vertical view a sharp front edge point, and tapering sides merging to a knife edge, the front edge of each plow being on a line inclined upwardly and rearwardly from the horizontal, the lowermost plow having the greatest inclination, and each succeeding upper plow having less inclination, the knives of each arm being displaced in respect to the arms, whereby the path of one plurality of arms is a different one than the path of the other plurality.

3. In a mash treating machine, the combination of a tub, a plurality of knives having spaced plows at an inclination to the knives, each plow having a different inclination, a support for said knives, extending from the center of the machine radially outwardly, and means for rotating the knives upon their axes, whereby the knives are adapted to be used for lautering and upon the rotation of the same for cleaning the tub, the lowermost plow having the greatest inclination, and each successive plow decreasing in inclination.

4. In a mash treating machine, the combination of a tub, a plurality of knives having spaced plows at an inclination to the knives, a support for said knives, extending from the center of the machine radially outwardly, and means for placing the knives at an angle to the vertical, whereby the knives when angularly placed are adapted to mix the contents of the tub, the front of said plows being on a line inclined rearwardly and upwardly, and the plows having different inclinations to the axes of the knives.

5. In a mash treating machine, the combination of a tub, a plurality of knives having spaced plows at an inclination to the knives, a support for said knives, extending from the center of the machine radially outwardly, means for rotating the knives upon their axes, and means for placing the knives at an angle to the vertical, whereby the knives are adapted to be used for lautering and upon the rotation of the same for cleaning the tub, and the knives when angularly placed are adapted to mix the contents of the tub, the front of said plows being on a line inclined rearwardly and upwardly, and the plows having different inclinations to the axes of the knives.

6. In a mash treating machine, a knife, having a vertical shank having a sharp edge at its front and rear and a narrow curved stream line between the edges, spaced plows on said shank forming tables of small depth, the table portions merging to sharpened edges extending around the shank, said plows widening from their front V-shaped entrance point, to substantially rounded rear portions, the front and rear of the plows being substantially in conjunction with the front and rear edges of the knives, the front of said plows being on a line inclined rearwardly and upwardly, and the plows having different inclinations to the axes of the knives.

7. In a mash treating machine, a knife having a vertical flat blade with curved front and rear edges forming knife edges, and plows secured transversely to the blades at an angle other than 90°, said plows extending rearwardly and upwardly, said plows having a reverse streamline contour with sharp edges, the lowermost plow having the greatest inclination, and each successive plow decreasing in inclination.

8. In a mash treating machine, a knife having a vertical flat blade with curved front and rear edges, and plows secured transversely to the blades at an angle other than 90°, said plows extending rearwardly and upwardly, the angles of the plows being different for each plow, the lowermost plow having the greatest inclination, and each successive plow decreasing in inclination.

9. In a mash treating machine, a knife having a vertical flat blade with curved front and rear edges, and plows secured transversely to the blades at an angle other than 90°, said plows extending rearwardly and upwardly, the angles of the plows being different for each plow, the front edges of the plows being on a rearwardly and upwardly inclined line to the axis of the knife, the lowermost plow having the greatest inclination, and each successive plow decreasing in inclination.

10. In a mash treating machine, a knife having a vertical flat blade with curved front and rear edges, extending throughout the entire length of the knife, and plows secured transversely to the blades at an angle other than 90°, said plows extending rearwardly and upwardly, each plow having a different inclination to the axis of the blade, and the front of each plow being on a line inclined rearwardly and up, and the rear of each plow being on a vertical line.

11. A mash treating machine comprising a tub, a plurality of cutting and loosening knives in the tub, said knives being substantially of equal length and having flat blades and plows secured transversely of the blades at an angle inclined rearwardly and upwardly, the plows of adjacent knives being offset lengthwise of the blades with respect to adjacent knives, means for holding said knives in position above the bottom of the tub for swinging movement about the tub, said means extending radially of the tub, the knives of one side of the tub being disposed offset to the knives of the other side of the tub, each of said plows having a different inclination, and the front and rear edges of the knives being of different inclinations.

ROBERT C. SCHOCK.